Patented May 16, 1950

2,507,700

UNITED STATES PATENT OFFICE 2,507,700

N,N',N''-TRIACYLMELAMINES

William S. Emerson and Tracy M. Patrick, Jr., Dayton, Ohio, assignors to Monsanto Chemical Company, St. Louis, Mo., a corporation of Delaware No Drawing. Application November 27, 1946, Serial No. 712,738

4 Claims. (Cl. 260—249.5)

This invention relates to certain new triacylmelamines.

An object of this invention is to provide new triacylmelamines having the following structural formula:

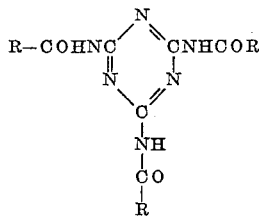

where R is an alkyl group of from 4 to 17 carbon atoms.

The present new triacylmelamines are waxy, crystalline products having a medium high melting point in the range of from 130° C. to 230° C. They are insoluble in water, organic solvents and resistant to the action of hydrolytic agents. They may be applied to fabrics for the production of water repellent finishes and may also be employed as constituents of polishing waxes.

The triacylmelamines of the above formula possess as a class a resistance to hydrolysis which is not shared by the lower triacylmelamines, that is, those where R in the above formula has a value of less than 4 carbon atoms. The present compounds also possess a lower melting point than that possessed by the lower acyl members, the lower melting point proper being of value in applications where the material is used for water repellent purposes or as constituents of polishing compositions.

The triacylmelamines of the above formula are prepared by heating mixtures of melamine with the appropriate acid anhydride, using a slight excess of the anhydride over that required by the theory. The temperature of heating should be at least 160° C. and preferably may be in the range of from 160° C. to 200° C. The reaction is moderately rapid and results in excellent yields of the desired product. It has been found desirable to employ efficient stirring of the mixture during the heating period.

At the completion of the reaction, the reaction mixture is diluted with some solvent such as methanol, ethanol, acetone or ethyl acetate, and then filtered. This treatment serves to remove any unreacted anhydride. The residual solid is then washed with additional solvent and dried to obtain the crude product. Further purification may be effected by crystallization from glacial acetic acid or from any of the anhydrides used in the preparation of the compound in question.

For the production of the present triacylmelamines, any anhydride derived from an aliphatic mono-carboxylic acid above butyric in number of carbon atoms and including stearic and oleic acid anhydrides may be used. The acid anhydrides may be derived from saturated acids, unsaturated acids of either straight- or branched-chain character.

In the manner described above, the following acid anhydrides were reacted with melamine: valeryl, isovaleryl, caproyl, oenanthyl, capryl, pelargonyl, lauryl, stearyl and oleyl to give the corresponding N,N',N''-triacylmelamine.

The reaction conditions, including temperature, time and yield, together with the melting point of the particular triacylmelamine prepared, are given in the following table:

Table

| Melamine Prepared | Melamine, moles | Anhydride, moles | Reaction Temp., °C. | Reaction Time, min. | Yield, Per Cent | M. P., °C. | Calcd., Per Cent N | Found, Per Cent N |
|---|---|---|---|---|---|---|---|---|
| N,N',N''-Tri-n-valeryl | 0.008 | 0.081 | 170-175 | 30 | 94 | 228-229 | 22.2 | 22.4 |
| N,N',N''-Triisovaleryl | 0.0016 | 0.019 | 165-170 | 15 | 85 | 216-218 | 22.2 | 21.8 |
| N,N',N''-Tricaproyl | 0.008 | 0.079 | 175 | 15 | 91 | 220 | 20.0 | 19.9 |
| N,N',N''-Trioenanthyl | 0.008 | 0.083 | 160 | 5 | 90 | 210 | 18.2 | 18.2 |
| N,N',N''-Tricaprylyl | 0.008 | 0.074 | 175 | 15 | 94 | 209 | 16.7 | 16.7 |
| N,N',N''-Tripelargonyl | 0.008 | 0.050 | 185 | 5 | 88 | 194-95 | 15.4 | 15.3 |
| N,N',N''-Trilauryl | 0.004 | 0.026 | 190-195 | 15 | 99 | 178-179 | 12.5 | 12.5 |
| N,N',N''-Tristearyl | 0.150 | 0.526 | 200 | 30 | 93 | 159-161 | 9.08 | 9.66 |
| N,N',N''-Trioleyl | 0.008 | 0.032 | 195-200 | 30 | 99 | 138-140 | 9.14 | 9.49 |

What we claim is:

1. Compounds having the formula:

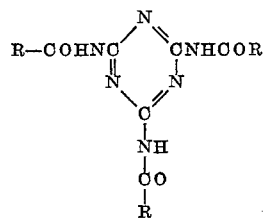

where R is an alkyl group of from 4 to 17 carbon atoms.

2. N,N',N''-Tristearylmelamine, a compound having the structure

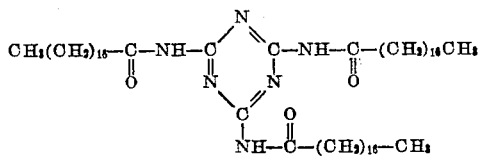

3. N,N',N''-Trilaurylmelamine, a compound having the structure

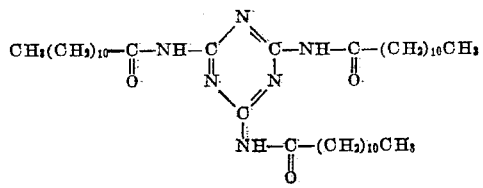

4. N,N',N''-Trioleylmelamine, a compound having the structure

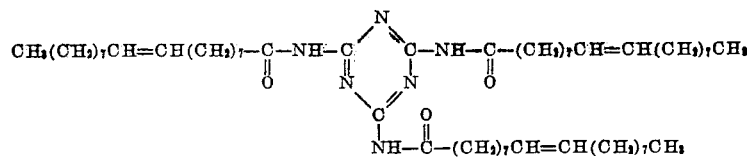

WILLIAM S. EMERSON.
TRACY M. PATRICK, Jr.

REFERENCES CITED

The following references are of record in the file of this patent:

UNITED STATES PATENTS

| Number | Name | Date |
|---|---|---|
| 2,165,265 | Hubert | May 21, 1936 |
| 2,273,687 | Bock | Feb. 17, 1942 |
| 2,381,121 | Ericks | Aug. 7, 1945 |

OTHER REFERENCES

Ostrogovich, Chemical Abstracts, vol. 30 (1936), pp. 465 and 466.
Textile Colorist, Jan. 1944, pp. 34 and 35.